(12) United States Patent
Kühnlenz et al.

(10) Patent No.: US 9,802,494 B2
(45) Date of Patent: Oct. 31, 2017

(54) DEVICE AND METHOD FOR SEPARATING AND CONNECTING TWO-PART BOARD NETWORKS

(71) Applicant: VOLKSWAGEN AG, Wolfsburg (DE)

(72) Inventors: Florian Kühnlenz, Barwedel (DE); Sebastian Splett, Braunschweig (DE)

(73) Assignee: Volkswagen AG (DE)

( * ) Notice: Subject to any disclaimer, the term of this patent is extended or adjusted under 35 U.S.C. 154(b) by 214 days.

(21) Appl. No.: 14/963,388

(22) Filed: Dec. 9, 2015

(65) Prior Publication Data

US 2016/0167533 A1    Jun. 16, 2016

(30) Foreign Application Priority Data

Dec. 10, 2014  (DE) .................. 10 2014 225 431

(51) Int. Cl.
*B60L 11/18*    (2006.01)

(52) U.S. Cl.
CPC ........... *B60L 11/18* (2013.01); *Y02T 10/7005* (2013.01)

(58) Field of Classification Search
CPC .............................. B60L 11/18; Y02T 10/7005
See application file for complete search history.

(56) References Cited

U.S. PATENT DOCUMENTS

| | | | | |
|---|---|---|---|---|
| 6,313,610 | B1 * | 11/2001 | Korsunsky | H01M 10/48 320/134 |
| 6,504,345 | B2 * | 1/2003 | Sakurai | H02J 7/0031 320/134 |
| 6,600,239 | B2 * | 7/2003 | Winick | H02J 1/102 307/85 |
| 7,382,594 | B2 * | 6/2008 | Migliavacca | H02H 3/207 361/84 |
| 7,432,754 | B2 * | 10/2008 | Kase | H03K 17/005 327/108 |
| 7,642,750 | B2 * | 1/2010 | Liu | H02J 7/0031 320/127 |
| 7,893,560 | B2 * | 2/2011 | Carter | H02J 1/10 307/64 |

(Continued)

FOREIGN PATENT DOCUMENTS

| | | |
|---|---|---|
| DE | 19548612 A1 | 6/1997 |
| DE | 19757113 A1 | 7/1999 |

(Continued)

OTHER PUBLICATIONS

Office Action for German Patent Application No. 10 2014 225 431.0; dated Aug. 14, 2015.

*Primary Examiner* — Thomas J Hiltunen
(74) *Attorney, Agent, or Firm* — Barnes & Thornburg LLP

(57) ABSTRACT

A device for disconnecting and connecting two on-board electrical subsystems having two series-connected switching elements and a control device, wherein the control device generates control signals for the switching elements depending on measured actual values and previously defined reference values of the on-board electrical subsystems and the switching elements are parallel circuits consisting of a diode and a controllable resistor. The controllable resistor can be controlled between a low-resistance minimum value and a high-resistance maximum value and the switching elements are arranged such that the two anodes or the two cathodes of the two diodes are interconnected.

10 Claims, 2 Drawing Sheets

(56) References Cited

U.S. PATENT DOCUMENTS

| | | | | |
|---|---|---|---|---|
| 8,350,532 | B2* | 1/2013 | Caraghiorghiopol | G06F 1/263 |
| | | | | 320/140 |
| 8,450,977 | B2* | 5/2013 | Niculae | H02M 1/08 |
| | | | | 320/134 |
| 8,981,839 | B2* | 3/2015 | Kay | H03K 17/687 |
| | | | | 307/43 |
| 9,166,419 | B2* | 10/2015 | Girard | B60L 11/1864 |
| 9,350,185 | B2* | 5/2016 | Longdon | H02J 7/0052 |
| 9,385,542 | B2* | 7/2016 | Chang | H02J 7/0019 |
| 9,419,458 | B2* | 8/2016 | Kumagai | B60L 11/1859 |
| 9,541,975 | B2* | 1/2017 | Ukai | G01R 31/3693 |
| 2006/0255768 | A1* | 11/2006 | Yoshio | H02J 7/0029 |
| | | | | 320/134 |
| 2016/0153418 | A1* | 6/2016 | Shibachi | F02N 11/0866 |
| | | | | 290/36 R |
| 2016/0181836 | A1* | 6/2016 | Kanabe | H02J 7/00 |
| | | | | 320/118 |

FOREIGN PATENT DOCUMENTS

| | | |
|---|---|---|
| DE | 69935831 T2 | 8/2007 |
| DE | 102007026164 A1 | 12/2008 |
| EP | 0987146 A2 | 3/2000 |
| WO | 2013093273 A1 | 6/2013 |

* cited by examiner

DEVICE AND METHOD FOR SEPARATING AND CONNECTING TWO-PART BOARD NETWORKS

PRIORITY CLAIM

This patent application claims priority to German Patent Application No. 10 2014 225 431.0, filed 10 Dec. 2014, the disclosure of which is incorporated herein by reference in its entirety.

SUMMARY

Illustrative embodiments relate to a device and a method for disconnecting and connecting two on-board electrical subsystems, particularly in a motor vehicle on-board electrical system.

BACKGROUND

On-board electrical subsystems having similar voltage levels are often interconnected but have voltage differences in real operation due to the different storage device technologies or storage device states of charge. In the case of 12 V on-board electrical systems with lead-acid batteries and lithium-ion batteries, voltage differences of up to 4 V can occur. A further problem may arise if on-board electrical system consumers in one on-board electrical subsystem require a high stability of the supply voltage, whereas the consumers in the other on-board electrical subsystem are highly dynamic. Switching elements are therefore known in on-board electrical systems of this type with on-board electrical subsystems for connecting or disconnecting the on-board electrical subsystems in a targeted manner.

In principle, the control strategy can be calculated by a microprocessor of a control device and a corresponding driver circuit can then be controlled for the transistors. However, this is critical in terms of the regulating speed. Alternatively, at least a part of the control unit can be designed in hardware, which is faster, but also incurs higher costs.

Disclosed embodiments provide a device for disconnecting and connecting on-board electrical systems, offering high regulating speed but incurring lower costs. Disclosed embodiments also provide a suitable method for the disconnection and connection.

BRIEF DESCRIPTION OF THE DRAWINGS

Disclosed embodiments are explained in detail below with reference to the drawings. In the figures.

DETAILED DESCRIPTION OF THE DISCLOSED EMBODIMENTS

Figure 1:
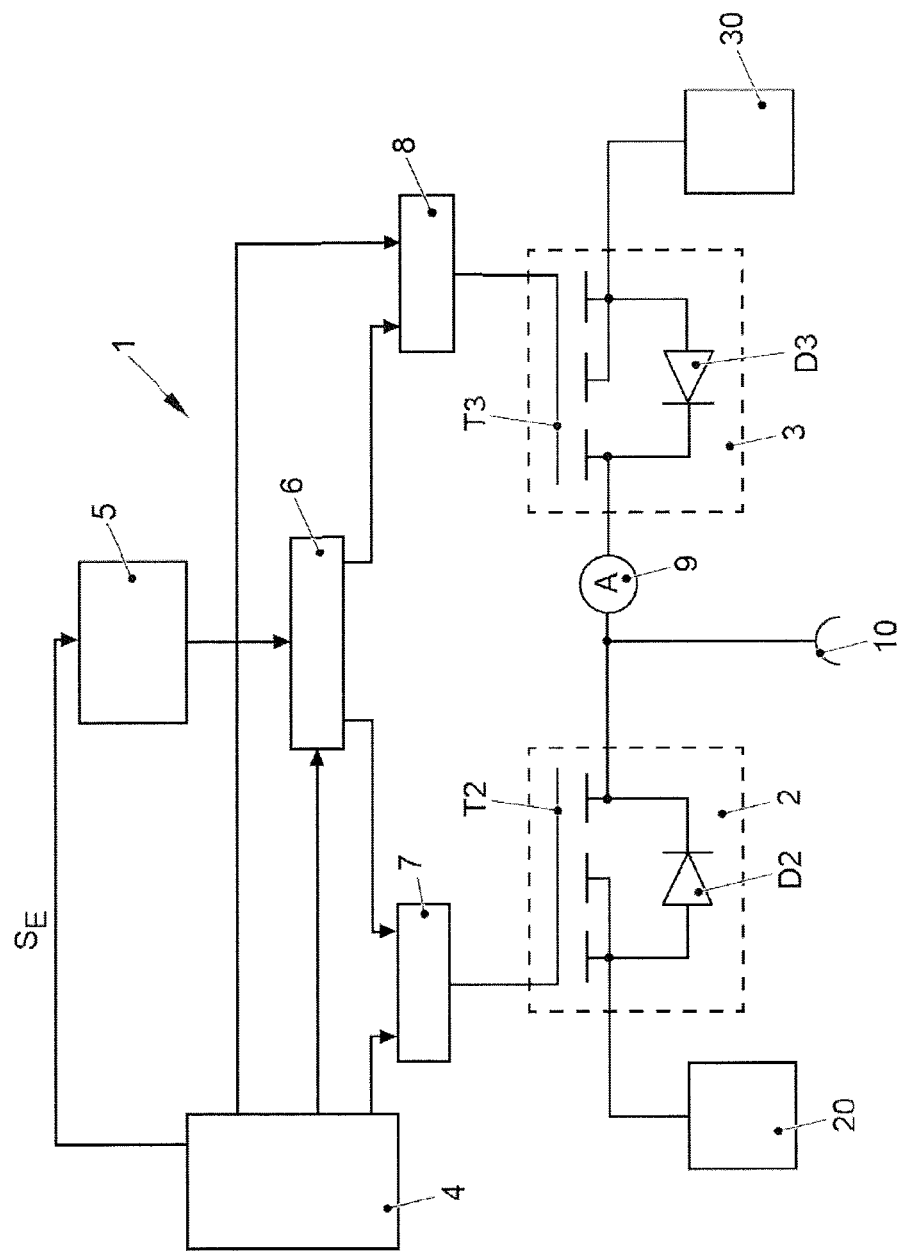
FIG. 1 shows a schematic block diagram of a device for connecting and disconnecting two on-board electrical subsystems in a first disclosed embodiment.

The device for disconnecting and connecting two on-board electrical subsystems comprises two series-connected switching elements and a control device, wherein the control device is designed in such a way that it generates control signals for the switching elements depending on measured actual values and previously defined reference values of the on-board electrical subsystems. The reference values are, for example, reference voltages of the on-board electrical subsystems. The actual values are, for example, actual voltages of the on-board electrical subsystems. A further reference value is, for example, a maximum current and a further actual value is the actual current. The switching elements are designed in each case as a parallel circuit consisting of a diode and a controllable resistor which may be designed as a transistor. The controllable resistor can be controlled between a low-resistance minimum value and a high-resistance maximum value. The minimum value is, for example, virtually 0Ω and the maximum value is in the MΩ range. The two switching elements are arranged in relation to one another in such a way that the two anodes or the two cathodes of the diodes are interconnected, wherein the two cathodes are may be interconnected. A regulator of the switching elements is at least partially or completely designed as hardware. The regulator is designed in such a way that a control signal is generated for a switching element to set a resistance between the minimum value and the maximum value. Furthermore, at least one control unit is allocated to the switching elements, the control unit being designed in such a way that it generates a control signal for a switching element depending on a signal of the control device to set the switching element to the minimum value or the maximum value. Furthermore, the device has at least one switchover device controllable by the control device, by means of which one switching element is connected to the regulator and the other switching element is connected to the at least one control unit. It should be noted here that the connection between the regulator and the switching element does not have to be direct, but a control unit acting as a driver may also be interposed. The basic principle consists in a halving of the regulation, i.e. the regulator in each case always regulates at most one switching element, whereas the other switching element is controlled by the control device, i.e. to the minimum or maximum value. This does not represent a problem in terms of the regulating speed. No significant restrictions in the regulation result from the halving of the regulation. Cost savings can be achieved accordingly through the halving of the regulation, since, for example, a corresponding ASIC can be designed as substantially smaller (as far as the number of components is concerned).

As already noted, the switching elements may be designed as MOSFETs which, by dint of their technology, automatically form the diodes also. In principle, however, the diodes and the controllable resistor can also be formed as separate components.

In at least one disclosed embodiment, the device has a demultiplexer as a switchover device, wherein the regulator or regulator output is disposed at the input. One output of the demultiplexer is connected to a control unit allocated to the first switching element and another output of the demultiplexer is connected to a control unit allocated to the second switching element. The control units are designed in such a way that they through-connect the signal of the regulator onto the allocated switching element when the input of the demultiplexer is connected to the allocated output. The control units primarily perform the task of a driver circuit. The control unit which is not connected to the regulator is controlled by the control device to through-connect or block the transistor as a controllable resistor. It should be noted here that the control units may also be designed in such a way that they are both controlled by the control device independently from the demultiplexer, for example to block or through-connect both transistors simultaneously. The regulator is always allocated in each case to at most one control unit or switching element. However, a through-connection or blocking command can also be integrated into the regulation, so that the regulator is then always allocated to one switching element.

In an alternative disclosed embodiment, the switchover device is formed by two multiplexers which are allocated in each case to a switching element, wherein the output of the multiplexer is connected to the allocated switching element. One input of the multiplexers is connected in each case to the regulator and the other input is connected to a control unit, wherein the control device is designed in such a way that it controls the multiplexers in such a way that the regulator simultaneously through-connects in the case of only one of the multiplexers. The driver function is normally integrated in this disclosed embodiment.

In a further disclosed embodiment, the control unit(s), the switchover device and/or the regulator are combined as one hardware component, for example an ASIC.

In a further disclosed embodiment, the control unit(s) and/or the switchover device are integrated in the control device.

In a further disclosed embodiment, a connection point for an external charging source is disposed between the switching elements. To charge the on-board electrical subsystems, the external charging source is set to the charging voltage of the on-board electrical subsystem with the higher charging voltage. The switching element of the on-board electrical subsystem with the higher charging voltage is switched to low resistance and the switching element of the other on-board electrical subsystem is controlled accordingly by the regulator in such a way that the necessary voltage difference compared with the charging voltage of this on-board electrical subsystem drops via the switching element.

FIG. 1 shows a device 1 for disconnecting and connecting two on-board electrical subsystems 20, 30. A 12 V lead-acid battery, for example, is disposed in the first on-board electrical subsystem 20, and a 12 V lithium-ion battery unit is disposed in the second subarea 30. The device 1 comprises two switching elements 2 and 3 which are designed as MOSFET transistors. The two MOSFET transistors are interconnected via their drain terminals. By dint of their technology, the real MOSFET transistors in each case have an intrinsic diode D2, D3, the cathodes of which are interconnected. The real MOSFET can therefore be regarded as an ideal transistor T2, T3 in each case with a parallel-connected diode D2, D3. Furthermore, the device 1 has a control device 4, a regulator 5, a demultiplexer 6 and two control units 7, 8. The regulator 5 is designed as a hardware module, for example as an ASIC, and receives input signals SE from the control device 4 or, where relevant, directly from measuring devices. The input signals SE are, for example, actual and reference voltage levels of the two on-board electrical subsystems 20, 30 and actual and reference currents between the on-board electrical subsystems 20, 30. The actual current is, for example, detected with the correct sign by a current sensor 9. The regulator 5 calculates a control value for one of the switching elements 2, 3 from the input signals SE to set a desired resistance on one of the transistors T2, T3. The control device 4 decides which switching element 2, 3 is to be controlled via the regulator 5 depending on the input signals SE and controls the demultiplexer 6 accordingly. If, for example, the switching element 3 allocated to the second on-board electrical subsystem 30 is to be controlled by the regulator 5, the demultiplexer 6 is controlled by the control device 4 in such a way that the output signals of the regulator 5 are fed to the control unit 8. A corresponding control signal for the gate of the transistor T3 is then generated in the control unit 8 which acts as a driver. The other switching element 2 is then controlled directly by the control device 4. This control device through-connects the transistor T2 (low-resistance minimum value) or blocks the transistor T2 (high-resistance maximum value). The control signal is applied to the control unit 7 and is converted there into a control signal for the gate of the transistor T2.

If, for example, both transistors T2, T3 are then to be blocked, this can be done in two ways.

Either the regulator 5 can generate a control signal of this type or the control device 4 can deactivate the demultiplexer 6 and then directly control both control units 7, 8. Alternatively, it can be provided that the control device 4 can block an output signal of the regulator 5 on one control unit 7, 8.

The regulator 5 has to calculate a regulated resistance value in each case for only at most one switching element 2, 3, whereas the other switching element 3, 2 is quasi-digitally controlled (through-connected or blocked) by the control device 4. All operating modes can thus be implemented, such as, for example, voltage equalization between the on-board electrical subsystems, decoupling of an unstable network. The only restriction compared with a simultaneous regulation of both adjustable resistors occurs in the case of charging with an external charging source. For this purpose, the device 1 has a connection point 10 between the two switching elements 2, 3.

It is again assumed that a 12 V lead-acid battery is disposed in the first on-board electrical subsystem 20 and a 12 V lithium-ion battery unit is disposed in the second on-board electrical subsystem 30, so that the first on-board electrical subsystem 20 requires a charging voltage of around 14 V, whereas the second on-board electrical subsystem 30 requires a charging voltage of around 13 V.

If both on-board electrical subsystems 20, 30 are to be charged simultaneously, the voltage of an external charging source is limited to 14 V. The switching element 2 is then switched accordingly to the low-resistance minimum value, whereas the second switching element 3 is regulated by the regulator 5 to set a voltage drop of 1 V over the switching element 3, so that the desired charging voltage of 13 V is set downstream of the switching element 3.

However, the simultaneous charging of both on-board electrical subsystems 20, 30 is not compulsory. It can thus also be provided alternatively that only one on-board electrical subsystem 20, 30 is intended to be charged. In this case, the switching element 2, 3 of the on-board electrical subsystem 20, 30 that is not intended to be charged is switched to high resistance. Depending on the voltage level of the external voltage source for the charging voltage of the on-board electrical subsystem 20, 30 that is to be charged, the associated switching element is then through-connected (charging voltage=voltage of the external charging source) or the resistance is adjusted by the regulator 5 in such a way that the difference between the voltage of the external voltage source and the charging voltage of the on-board electrical subsystem 20, 30 drops over the switching element 2, 3. Both on-board electrical subsystems 20, 30 can thus be charged successively even if the voltage of the external voltage source is not adjusted.

Figure 2:
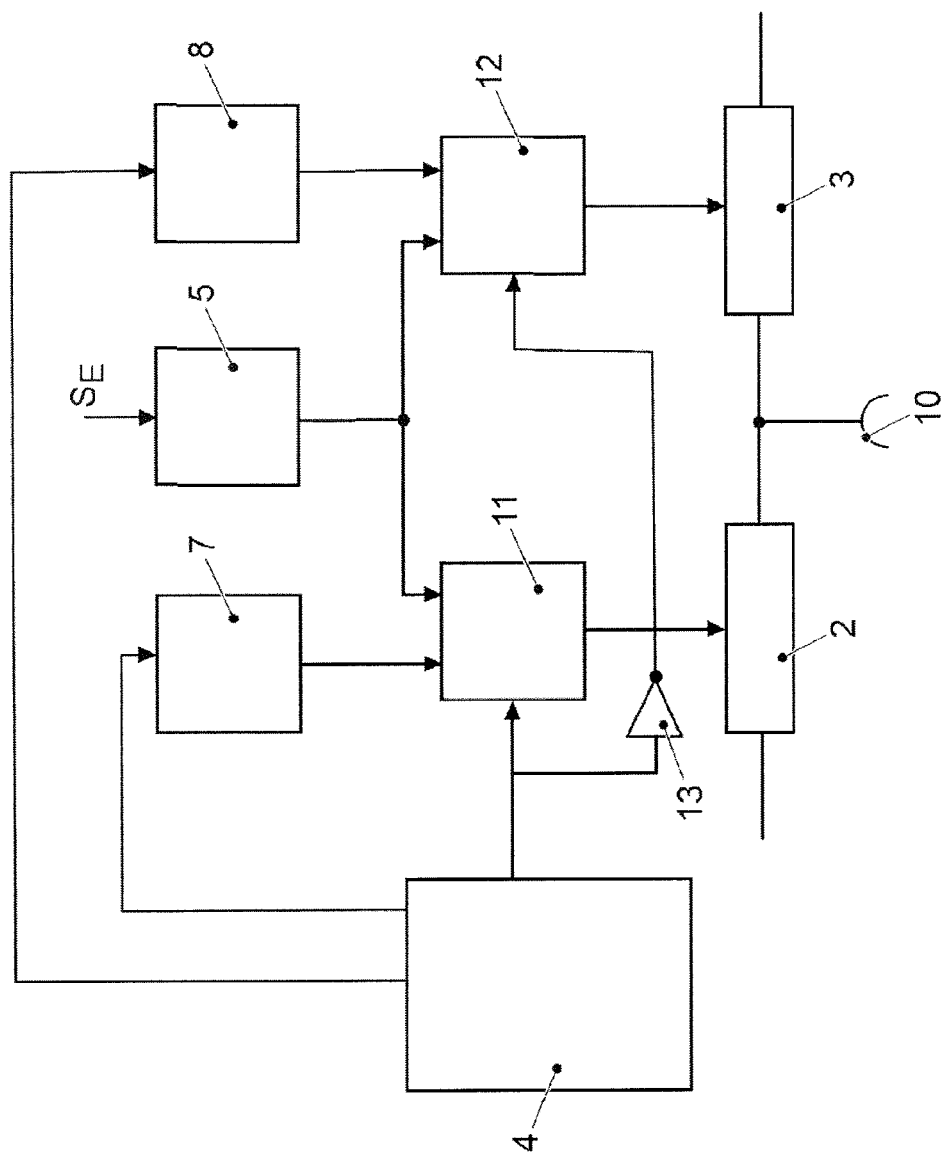
FIG. 2 shows a schematic block diagram of a device for connecting and disconnecting two on-board electrical subsystems in a second disclosed embodiment.

FIG. 2 shows an alternative embodiment of the device 1, wherein only the differences are intended to be presented below. The switchover device is formed by two multiplexers 11, 12, wherein the output of the first multiplexer 11 is connected to the first switching element 2 and the output of the second multiplexer 12 is connected to the second switching element 3. The output signal of the first control unit 7 is applied to a first input of the first multiplexer 11 and the output signal of the regulator 5, which has integrated a corresponding driver for the switchover elements 2, 3, is applied to a second input of the first multiplexer 11. The output signal of the regulator 5 is applied to a first input of the second multiplexer 12 and the output signal of the second control unit 8 is applied to a second input of the second multiplexer 12. The two control units 7, 8 receive their input signals from the control device 4 to control the respective switching element 2, 3 to the low-resistance minimum value (transistor through-connected) or the high-resistance maximum value (transistor blocked). The control device 4 must again guarantee that the output signal of the regulator 5 is not fed simultaneously to both switching elements 2, 3.

For example, this can be effected by means of an inverter 13 which inverts the control signal for the first multiplexer 11 and feeds it to the second multiplexer 12. However, this very simple inversion does not allow the signals of the first and second control units 7, 8 to be through-connected simultaneously. If this is also intended to be possible, two control signals which are independent from one another must be generated for the multiplexers 11, 12, wherein the signal combination must be prevented by the control device 4, wherein the output signal of the regulator 5 would be through-connected to both multiplexers 11, 12.

On-board electrical subsystems having similar voltage levels are often interconnected but have voltage differences in real operation due to the different storage device technologies or storage device states of charge. In the case of 12 V on-board electrical systems with lead-acid batteries and lithium-ion batteries, voltage differences of up to 4 V can occur. A further problem may arise if on-board electrical system consumers in one on-board electrical subsystem require a high stability of the supply voltage, whereas the consumers in the other on-board electrical subsystem are highly dynamic. Switching elements are therefore known in on-board electrical systems of this type with on-board electrical subsystems for connecting or disconnecting the on-board electrical subsystems in a targeted manner.

From EP 0 987 146 B1, a two-battery system is known comprising a starter battery, a generator, primary consumers, an on-board electrical system battery, a starter and a power switch disposed between the starter battery and the on-board electrical system battery. A MOSFET, via which a charging gate can be released, is disposed in parallel with the power switch. A second MOSFET may be provided, wherein the two source terminals may be interconnected. The two MOSFETs are in each case operated as switches, i.e. they are through-connected or blocked.

From DE 195 48 612 B4, a multi-circuit vehicle on-board electrical system is known, comprising a generator, consumers, buffer memories disposed on one side or both sides and an analog switch, for the temporary connection of electric circuits of the multi-circuit vehicle on-board electrical system. The analog switch has at least two controllable field effect transistors of which the drain or source terminals are interconnected. A Zener diode which limits the maximum voltage between the relevant electrodes is located between the source electrodes of the field effect transistors and the gate electrode of the two field effect transistors. The gate electrodes are connected to a MOSFET driver with a charge pump. It is disclosed here that the MOSFETs can also be controlled in such a way that the gate voltage is varied so that the analog switch can also be used as a linear regulator.

From DE 699 35 831 T2, an electrical system for motor vehicles is known, comprising a starter battery side with a starter battery and a starter motor which is connected to the starter battery. Furthermore, the system comprises a consumer side with a generator and a consumer battery which is connected to a plurality of consumers. Furthermore, the system has a charge controller which is disposed between the starter battery side and the consumer battery side via first and second conductors to control the current between the two sides. An engine control device is connected to the charge controller via a third conductor via which the engine control device is powered from one of the battery sides. The charge controller has a first and a second transistor which are controlled by means of an electronic control unit, wherein the control unit is contained in the charge controller. The two transistors are connected in series, wherein the node is connected to the third line. A diode is connected in each case in parallel with the transistors, wherein the diodes are aligned with one another. In inactive states, the two transistors are blocked, wherein the engine control receives current via the diode, the allocated voltage side of which lies on the higher level. The transistors may be MOSFETs which, by dint of their technology, already have an intrinsic diode. The two transistors can also be controlled as linear regulators, i.e. the resistance value can be regulated between a minimum value (through-connected) and a maximum value (blocked), a specific design of the control unit is not disclosed.

In principle, the control strategy can be calculated by a microprocessor of a control device and a corresponding driver circuit can then be controlled for the transistors. However, this is critical in terms of the regulating speed. Alternatively, at least a part of the control unit can be designed in hardware, which is faster, but also incurs higher costs.

The invention claimed is:

1. A device for disconnecting and connecting two on-board electrical subsystems, the device comprising two series-connected switching elements and a control device, wherein the control device generates control signals for the switching elements depending on measured actual values and previously defined reference values of the on-board electrical subsystems, wherein the switching elements in each case are a parallel circuit consisting of a diode and a controllable resistor, wherein the controllable resistor can be controlled between a low-resistance minimum value and a high-resistance maximum value, wherein the switching elements are arranged such that the two anodes or the two cathodes of the diodes are interconnected, wherein a regulator of the switching elements is designed at least partially as hardware, being designed such that a control signal is generated for a switching element to set a resistance value between the minimum value and the maximum value, wherein at least one control unit is allocated to the switching elements, said control unit being designed such that the control unit generates a control signal for a switching element depending on a signal of the control device to set said switching element to the minimum value or the maximum value, wherein the device has at least one switchover device controllable by the control device, by which one switching element is connected to the regulator and the other switching element is connected to the at least one control unit.

2. The device of claim 1, wherein the switching elements are designed as MOSFETs.

3. The device of claim 1, wherein the device has a demultiplexer as a switchover device, wherein the regulator is disposed at the input, wherein one output of the demultiplexers is connected to a control unit allocated to the first switching element and another output of the demultiplexer is connected to a control unit allocated to the second switching element, wherein the control units are designed such that they through-connect the signal of the regulator onto the allocated switching element when the input of the demultiplexer is connected to the allocated output.

4. The device of claim 1, wherein the switchover device is formed by two multiplexers which are allocated in each case to a switching element, wherein the output of the multiplexer is connected to the allocated switching element, wherein one input of the multiplexers is connected in each case to the regulator and the respective other input is connected to a control unit, wherein the control device is designed such that it controls the multiplexers in such a way that the regulator is simultaneously through-connected in the case of only one of the multiplexers.

5. The device of claim 1, wherein the control units, the switchover device and/or the regulator are combined as one hardware component.

6. The device of claim 1, wherein at least one of the control units and/or the switchover device are integrated in the control device.

7. The device of claim 1, wherein a connection point for an external charging source is disposed between the switching elements.

8. A method for disconnecting and connecting two on-board electrical subsystems, by means of two series-connected switching elements and a control device, wherein the control device generates control signals for the switching elements depending on measured actual values and previously defined reference values of the on-board electrical subsystems, wherein the switching elements in each case as a parallel circuit consist of a diode and a controllable resistor, wherein the controllable resistor can be controlled between a low-resistance minimum value and a high-resistance maximum value, wherein the two anodes or the two cathodes of the diodes are interconnected, wherein a regulator of the switching elements is designed at least partially as hardware, said regulator generating a control signal for a switching element to set a resistance value between the minimum value and the maximum value, wherein at least one control unit is allocated to the switching elements, said control unit generating a control signal for a switching element depending on a signal of the control device to set said switching element to the minimum value or the maximum value, wherein at least one switchover device is provided which is controlled by the control device to connect one switching element to the regulator and the other switching element to the at least one control unit.

9. The method of claim 8, wherein the switchover device is controlled by the control device such that at most one switching element is connected to the regulator.

10. The method of claim 8, wherein the external charging source is set to the charging voltage of the on-board electrical subsystems with the higher charging voltage for the simultaneous charging of the on-board electrical subsystems.

\* \* \* \* \*